July 30, 1968 G. V. CONIGLIO 3,394,975
PETZVAL TYPE OBJECTIVE INCLUDING FIELD SHAPING LENS
Filed Sept. 25, 1963
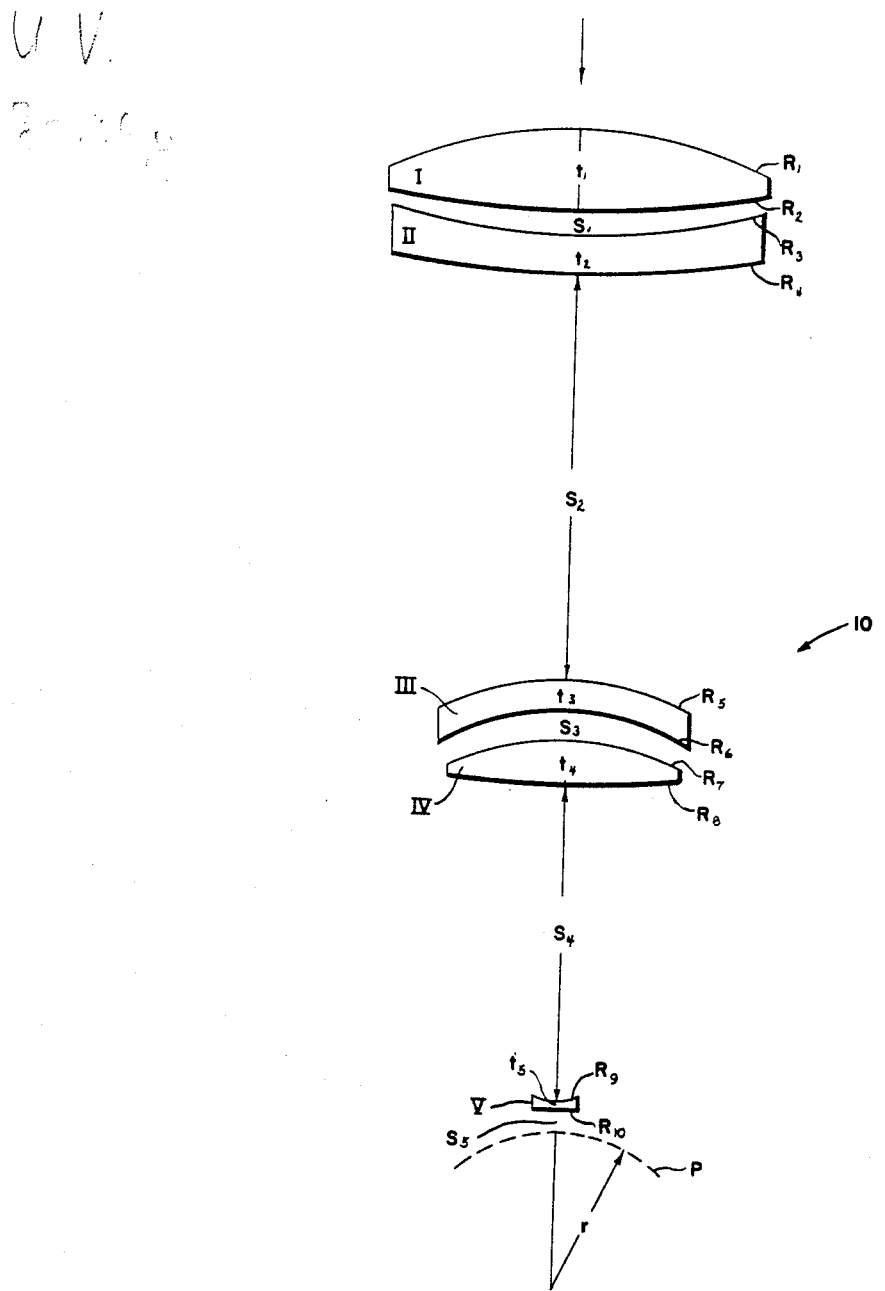
GUY V. CONIGLIO
INVENTOR
BY Frank C. Parker
ATTORNEY 3,394,975
PETZVAL TYPE OBJECTIVE INCLUDING
FIELD SHAPING LENS
Guy V. Coniglio, Rochester, N.Y., assignor to the United States of America as represented by the Administrator of the National Aeronautics and Space Administration
Filed Sept. 25, 1963, Ser. No. 311,387
2 Claims. (Cl. 350—2)

The present invention relates to optical objectives and more particularly relates to an objective for focusing light of a specified wavelength band upon a curved photoreceptor.

Generally, the optical objective here disclosed follows the Petzval form of objective and it is an object of this invention to provide such an objective which is useful in collecting and focusing distant radiation in a curved image surface such that its shape corresponds closely to the shape of a photoreceptor plate or the like.

It is a further object to provide such a device which is composed of simple optical components, and furthermore it is an object to provide an optical system which is capable of wide band transmission of the order of .32 micron to .6 micron.

Further objects and advantages will be apparent from a study of the specification herebelow taken in connection with the accompanying drawing wherein the single figure represents an optical diagram of an objective constructed according to the present invention.

A preferred form of the objective is designated generally by the numeral 10 in the drawing and said objective is composed of three successive and mutually spaced groups of lenses, the front group of lenses nearest to entrant light as shown by the arrow being designated successively I and II, the second lens member being designated III and IV and the third lens member being designated V. The lens V is so constructed along with the other two lens members that a curved field or image having the radius $r$ is produced whereby said objective may be used in a device such as a star tracker having a photosensitive plate located in conformity to the image P. It will be understood that the objective 10 is corrected for the ordinary chromatic, spherical and astigmatic aberrations as well as coma and distortion within good and acceptable optical requirements.

The front lens member is composed of a double convex lens element which is designated I, this element being spaced from a rearward meniscus lens element which is designated II by an axial distance $S_1$. Spaced rearwardly from the front lens member by a distance $S_2$ is the second lens member which is composed of a meniscus lens which is designated III and is separated from a rearward double convex lens element IV by an axial distance which is designated $S_3$. Spaced rearwardly of the second lens member by a distance $S_4$ is a field shaping singlet lens element designated V which is located at an axial distance of $S_5$ ahead of the curved image surface P.

For properly attaining the objects of this invention the constructional data for the objective 10 should be specified according to the values stated in the table of mathematical statements herebelow wherein $R_1$ to $R_{10}$ designate the radii of the lens surfaces of the successive lens members I–V and the minus (—) sign used therewith is assigned to those surfaces having their centers of curvature located on the entrant side of their vertices, the axial thicknesses of said successive lens elements are represented by $t_1$ to $t_5$, and the axial spaces between the elements are designated successively $S_1$ to $S_5$. The symbol F designates the equivalent focal length of the objective 10 herebelow.

$$.271 < \frac{R_1}{-R_2} < .299 \text{ (absolute value)}$$

$$.593 < \frac{-R_3}{-R_4} < .655 \text{ (absolute value)}$$

$$1.155 < \frac{R_5}{R_6} < 1.277 \text{ (absolute value)}$$

$$.0708 < \frac{R_7}{-R_8} < .0782 \text{ (absolute value)}$$

$$.1308F < -R_9 < .1598F$$
$$R_{10} > \pm 2.0F$$

$$.094F < t_1 < .136F$$
$$.0516F < t_2 < .063F$$
$$.0368F < t_3 < .045F$$
$$.059F < t_4 < .072F$$
$$.0111F < t_5 < .0135F$$

$$.0295F < S_1 < .0461F$$
$$.557F < S_2 < .681F$$
$$.0412F < S_3 < .0504F$$
$$.393F < S_4 < .481F$$
$$.01577F < S_5 < .01927F$$

One of the novel features of this invention concerns the optical materials from which the lens elements are made and in this regard the lens elements designated I, IV and V are constructed of fused quartz having a refractive index of substantially 1.4754 with respect to radiation having a wavelength $\lambda = .36$ micron. Furthermore, the remaining two lens elements II and III are made of CsI (cesium iodide) which has a refractive index of substantially 1.8832 for wavelength radiations $\lambda = .36$ micron.

In a more specific manner the constructional data for the objective 10 may be stated with regard to the construction data above mentioned as given in the table of mathematical expressions herebelow.

$$R_1 = .762F$$
$$-R_2 = 2.665F$$
$$-R_3 = 1.160F$$
$$-R_4 = 1.857F$$
$$R_5 = .396F$$
$$R_6 = .325F$$
$$R_7 = .378F$$
$$-R_8 = 5.070F$$
$$-R_9 = .1453F$$
$$R_{10} = \text{Plano}$$
$$t_1 = .115F$$
$$t_2 = .0573F$$
$$t_3 = .0409F$$
$$t_4 = .0655F$$
$$t_5 = .0123F$$
$$S_1 = .0328F$$
$$S_2 = .619F$$
$$S_3 = .0458F$$
$$S_4 = .437F$$
$$S_5 = .0175F$$

It is to be understood that the above given values are determined for an objective which transmits radiation in a wave band of substantially $\lambda = .36$ micron as above mentioned, and the designations for various data have the same meaning as used in the previous tables.

The values for the constructional data of said objective are stated numerically in the chart of values appearing herebelow, the designations for radii, lens thickness and lens spacing as well as the refractive index being the same as given hereabove except that the refractive index is designated by $n_D$.

E.F.=122.03 mm. when λ=.36 micron

| Lens | Radii | Thicknesses | Spaces | $n_D$ |
|---|---|---|---|---|
| I | $R_1 = 92.897$<br>$-R_2 = 325.09$ | $t_1 = 14.0$ | | 1.4754 |
| | | | $S_1 = 4.0$ | |
| II | $-R_3 = 141.50$<br>$-R_4 = 227.01$ | $t_2 = 7.0$ | | 1.8832 |
| | | | $S_2 = 75.7$ | |
| III | $R_5 = 48.25$<br>$R_6 = 39.692$ | $t_3 = 5.0$ | | 1.8832 |
| | | | $S_3 = 5.6$ | |
| IV | $R_7 = 46.132$<br>$-R_8 = 619.44$ | $t_4 = 8.0$ | | 1.4754 |
| | | | $S_4 = 53.45$ | |
| V | $-R_9 = 17.701$<br>$R_{10} =$ Plano | $t_5 = 1.5$ | | 1.4754 |
| | | | $S_5 = 2.14$ | |

Although only certain forms of this invention have been shown and described in detail, it will be understood that other forms are possible and changes may be made in the values of the optical data within the stated ranges without departing from the spirit of the invention as claimed herebelow.

I claim:

1. A Petzval type of projection objective for focusing a beam of radiation of λ=nominally .36 micron forming a curved image surface having a radius of substantially .256F, where F represents the equivalent focal length of said objective, said objective comprising three lens members which are optically aligned with and spaced from each other, the front lens member on the entrant side including a front double convex lens element which is made of fused quartz and is designated I, and further including a rear concavo-convex lens element which is spaced from element I and is formed of CsI and is designated II, the second lens member including a front convex-concavo lens element which is made of CsI and is designated III, and further includes a double convex lens element which is spaced from element III and is formed from fused quartz, said element being designated IV, the third lens member which is a singlet negative field shaping lens being of concave plano form and being designated V, the specific optical data for constructing said objective being given in the table of mathematical expressions herebelow wherein $R_1$ to $R_{10}$ designate the radii of the lens surfaces of the successive lens members I to V, and the minus (—) sign used therewith is assigned to those surfaces having their centers of curvature located on the entrant side of their vertices, the axial thicknesses of said successive lens elements are represented by $t_1$ to $t_5$, and the axial spaces between the elements are designated successively $S_1$ to $S_5$, $R_1 = .762F$
$-R_2 = 2.665F$
$-R_3 = 1.160F$
$-R_4 = 1.857F$
$R_5 = .396F$
$R_6 = .325F$
$R_7 = .378F$
$-R_8 = 5.070F$
$-R_9 = .1453F$
$R_{10} =$ Plano
$t_1 = .115F$
$t_2 = .0573F$
$t_3 = .0409F$
$t_4 = .0655F$
$t_5 = .0123F$
$S_1 = .0328F$
$S_2 = .619F$
$S_3 = .0458F$
$S_4 = .437F$
$S_5 = .0175F$ said objective further being characterized by its quartz lens elements I, IV and V having a refractive index for its optical material of substantially 1.4754, and its CsI lens elements II and III having a refractive index for its optical material of substantially 1.8832 for λ=.36 micron.

2. A Petzval type of projection objective for focusing a beam of radiation of λ=nominally .36 micron forming a curved image surface having a radius of substantially .256F, where F represents the equivalent focal length of said objective, said objective comprising three lens members which are optically aligned with and spaced from each other, the front lens member on the entrant side including a front double convex lens element which is made of fused quartz and is designated I, and further including a rear concavo-convex lens element which is spaced from elements I and is formed of CsI and is designated II, the second lens member including a front convex-concavo lens element which is made of CsI and is designated III, and further includes a double convex lens element which is spaced from element III and is formed from fused quartz, said element being designated IV, the third lens member which is a singlet negative field shaping lens being of concavo plano form and being designated V, the constructional data for said objective being given in numerical values in the chart herebelow wherein $R_1$ to $R_{10}$ designate the radii of the lens surfaces of the successive lens elements I to V and the minus (—) sign used therewith means that the center of curvature lies on the entrant side of the vertex of such surfaces, the axial thicknesses of said lens elements are represented by $t_1$ to $t_5$, the axial spaces between the elements are designated successively $S_1$ to $S_5$, and $n_D$ denotes the refractive index of the optical materials in said elements for transmitted radiation of λ=.36 micron, E.F.=122.03 mm. when λ=.36 micron

| Lens | Radii | Thicknesses | Spaces | $n_D$ |
|---|---|---|---|---|
| I | $R_1 = 92.897$<br>$-R_2 = 325.09$ | $t_1 = 14.0$ | | 1.4754 |
| | | | $S_1 = 4.0$ | |
| II | $-R_3 = 141.50$<br>$-R_4 = 227.01$ | $t_2 = 7.0$ | | 1.8832 |
| | | | $S_2 = 75.7$ | |
| III | $R_5 = 48.25$<br>$R_6 = 39.692$ | $t_3 = 5.0$ | | 1.8832 |
| | | | $S_3 = 5.6$ | |
| IV | $R_7 = 46.132$<br>$-R_8 = 619.44$ | $t_4 = 8.0$ | | 1.4754 |
| | | | $S_4 = 53.45$ | |
| V | $-R_9 = 17.701$<br>$R_{10} =$ Plano | $t_5 = 1.5$ | | 1.4754 |
| | | | $S_5 = 2.14$ | |

References Cited

UNITED STATES PATENTS 2,541,484   2/1951   Schade _____ 88—57

FOREIGN PATENTS 710,326   9/1941   Germany.

JOHN K. CORBIN, *Primary Examiner.*